US009253775B2

United States Patent
Li et al.

(10) Patent No.: US 9,253,775 B2
(45) Date of Patent: Feb. 2, 2016

(54) METHOD, USER EQUIPMENT AND BASE STATION FOR DETERMINING TIMING ADVANCE

(71) Applicants: Bin Li, Shenzhen (CN); Wenzhong Zhang, Shenzhen (CN)

(72) Inventors: Bin Li, Shenzhen (CN); Wenzhong Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/129,161

(22) PCT Filed: Jul. 25, 2013

(86) PCT No.: PCT/CN2013/080062
§ 371 (c)(1),
(2) Date: Dec. 24, 2013

(87) PCT Pub. No.: WO2013/185687
PCT Pub. Date: Dec. 19, 2013

(65) Prior Publication Data
US 2015/0181595 A1    Jun. 25, 2015

(30) Foreign Application Priority Data

Aug. 8, 2012  (CN) .......................... 2012 1 0279976

(51) Int. Cl.
| | | |
|---|---|---|
| H04W 72/04 | (2009.01) | |
| H04L 5/00 | (2006.01) | |
| H04W 74/08 | (2009.01) | |
| H04W 56/00 | (2009.01) | |

(52) U.S. Cl.
CPC ......... *H04W 72/0446* (2013.01); *H04L 5/0058* (2013.01); *H04W 56/00* (2013.01); *H04W 74/0833* (2013.01)

(58) Field of Classification Search
None
See application file for complete search history.

(56) References Cited

U.S. PATENT DOCUMENTS

| 2011/0103499 A1* | 5/2011 | Cheng et al. | .................. 375/260 |
| 2013/0163534 A1* | 6/2013 | Anderson et al. | ............. 370/329 |

FOREIGN PATENT DOCUMENTS

| CN | 101123467 A | 2/2008 |
| CN | 101772180 A | 7/2010 |
| CN | 102415198 A | 4/2012 |
| EP | 2096783 A2 | 9/2009 |

(Continued)

OTHER PUBLICATIONS

International Search Report for PCT/CN2013/080062 dated Oct. 11, 2013.

(Continued)

*Primary Examiner* — Kevin C Harper
*Assistant Examiner* — Derrick V Rose
(74) *Attorney, Agent, or Firm* — Ling Wu; Stephen Yang; Ling and Yang Intellectual Property (57) ABSTRACT

The embodiment of the present document provides a method, user equipment and base station for determining a timing advance, which can support a larger cell radius without changing the protocol, the required device complexity is low, and with the UE side transmitting msg3 by using different TA adjustments to obtain a correct timing deviation value, the access delay of the PRACH is minimized, and the overhead of the PRACH sub-frame will not be increased, which can prevent the performance of the system from deterioration, and it can be applied to TDD and FDD LTE systems simultaneously.

14 Claims, 3 Drawing Sheets

(56) References Cited

FOREIGN PATENT DOCUMENTS

| | | | |
|---|---|---|---|
| WO | 2009088345 | A2 | 7/2009 |
| WO | 2010123430 | A1 | 10/2010 |
| WO | 2013051991 | A1 | 4/2013 |

OTHER PUBLICATIONS

ZTE, "Multiple RACH procedures for Carrier Aggregation", 3GPP TSG-RAN WG4 Meeting #61, R4-115596, Nov. 18, 2011, the whole document.

* cited by examiner

METHOD, USER EQUIPMENT AND BASE STATION FOR DETERMINING TIMING ADVANCE

TECHNICAL FIELD

The present document relates to the field of communications, and in particular, to a method, user equipment and base station for determining timing advance.

BACKGROUND OF THE RELATED ART

Random Access is an access process of a User Equipment (UE) before starting communication with a network. In the Long Term Evolution (LTE) system, the random access can be divided into two types: Synchronized Random Access and Non-synchronized Random Access. When the UE and the system achieve uplink synchronization, the random access process of the UE is referred to as synchronized random access; and when the UE and the system have not achieved uplink synchronization or lost uplink synchronization, the random access process of the UE is referred to as non-synchronized random access. Because when making non-synchronized random access, the UE has not obtained accurate uplink synchronization, one main characteristics of the difference between the non-synchronized random access and the synchronized random access is that the clock for the uplink transmission of the UE needs to be estimated and adjusted, to control the synchronization error to be within the length of the Cyclic Prefix (CP).

Under normal circumstances, the UE first performs downlink synchronization through a Synchronization Channel (SCH for short) after being started up to obtain a radio frame number, a location for receiving the sub-frame and a cell ID; and then detects a Broadcast Channel (BCH for short) to obtain the system information, which includes the configuration information of the Random Access Channel (RACH) channel, and finally performs uplink synchronization through the RACH channel to complete the process of accessing the system. This process belongs to non-synchronized random access.

In the 3rd Generation Partnership Project (3GPP) LTE protocol, a number of preamble sequences of the uplink random access are provided. In the uplink synchronization transmission process, the UE obtains the location of the RACH channel according to the radio frame and the location of the sub-frame determined in the downlink synchronization, and randomly selects one preamble sequence as a preamble for transmission from available preamble sequences; the base station side detects it to determine the timing advance for the uplink synchronization, and transmits it to the UE; the UE adjusts the timing for uplink transmission data according to the timing advance sent by the base station, to implement the time synchronization of the uplink channel.

The uplink random access preamble sequence specified in the LTE protocol is a Zadoff-Chu (ZC) sequence, and the $u^{th}$ root ZC sequence is defined as:

$$x_u(n) = e^{-j\frac{\pi u n(n+1)}{N_{ZC}}}, 0 \leq n \leq N_{ZC} - 1$$

wherein, u is an index number of the root ZC sequence, $N_{ZC}$ is the length of the ZC sequence and $N_{ZC}$ is a prime number, the value thereof specified in the LTE protocol is 839 or 139.

Figure 1:
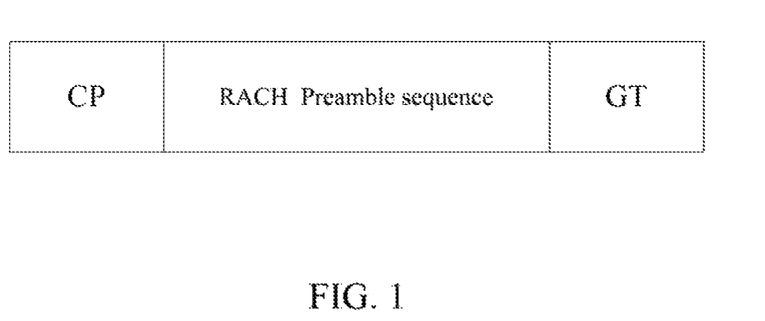
FIG. 1 is a diagram of modules composing a PRACH sub-frame specified in the existing LTE protocol.

As shown in FIG. 1, the random access sub-frame specified in the LTE protocol is comprised of three parts, which are the CP part, the RACH preamble sequence part and the Guard Interval (GT) part respectively. Wherein, the preamble sequence is derived by selecting different cyclic shifts (Ncs) based on the ZC sequence.

According to different cell coverage, the required CP lengths are different, and the lengths of the GTs and the preambles are also different. The existing LTE system supports five Formats, which are Formats 0-4 respectively, each Format corresponding to different cell coverage. The cell coverage radius is decided by both the cyclic shift of the sequence and the length of the GT.

In accordance with the protocol Format, the maximum cell radiuses supported by Format 0~Format 4 calculated respectively are shown in Table 1. Wherein, $T_{CP}$, $T_{SEQ}$ and $T_{GT}$ are the time-domain lengths of the CP part, the preamble sequence part and the GT part respectively; and Ts is a time unit specified by the LTE protocol, $T_s=1/(15000\times2048)$ second.

TABLE 1 cell coverage radiuses supported by different formats

| Format | $T_{CP}$ | $T_{SEQ}$ | $T_{GT}$ | cell radius supported |
|---|---|---|---|---|
| Format 0 | 3168 $T_s$ | 24576 $T_s$ | 2976 $T_s$ | 14.5 km |
| Format 1 | 21024 $T_s$ | 24576 $T_s$ | 15840 $T_s$ | 77 km |
| Format 2 | 6240 $T_s$ | 2 × 24576 $T_s$ | 6048 $T_s$ | 30 km |
| Format 3 | 21024 $T_s$ | 2 × 24576 $T_s$ | 21984 $T_s$ | 100 km |
| Format 4 | 448 $T_s$ | 4096 $T_s$ | 614 $T_s$ | 3 km |

It can be seen from the table above, under the existing LTE protocol, the maximum cell radius which can be supported by the Physical Random Access Channel (PRACH) is 100 Km. However, as the LTE system is applied more and more widely, the power and the efficiency of the Radio frequency device increase gradually, and it needs to support a larger cell radius. For such requirement, the LTE protocol can not satisfy that at present.

In order to increase the cell radius, a solution which is available for consideration includes: modifying the Format of the random access sub-frame of the protocol, increasing the time-domain lengths of the CP part, the preamble sequence part and the GT part etc. However, the change of the random access sub-frame will certainly result in the PRACH channel occupying more physical resources, which reduces the performance of the service channel of the system; at the same time, the Time Division Duplexing (TDD) LTE can not support the time-domain length of a larger random access sub-frame under the existing frame format, i.e., such a solution can not be applied in the TDD LTE system.

SUMMARY OF THE INVENTION

The embodiment of the present document provides a method, user equipment and base station for determining timing advance, to overcome a defect that the prior art can not satisfy a requirement of supporting a larger cell radius which is larger than 100 km.

In order to solve the above problem, the embodiment of the present document provides a method for determining a Timing Advance (TA), which is applied in a random access process with large cell radius coverage in a Long Term Evolution (LTE) system, comprising:

a user equipment transmitting a random access sub-frame using Format3 specified by an LTE protocol;

the user equipment calculating and obtaining a timing adjustment set $\{[(m-1)\times P+\tilde{TA}]\times T_s\}$ for msg3 transmission according to an estimation $\tilde{TA}$ of a received TA which is transmitted by a base station and a cell radius coverage distance K; wherein, m=1, 2, . . . , M, the value of M is a minimum natural number which is greater than or equal to the quotient of K and R; R=P*c/2, which is a reference value used to calculate a number of the elements of the above set which is defined by P, wherein, c is a speed of light; the units of K and R are Km; P=TA*16 Ts; Ts=1/(15000×2048) second; the msg3 is transmission information in the random access process specified by the LTE protocol;

adjusting the uplink transmission timing respectively according to the values of elements in the timing adjustment set, to perform uplink msg3 transmission;

when receiving an Acknowledgement (ACK) returned by the base station side, stopping the msg3 transmission, and using the timing adjustment, which is used when the msg3 is transmitted last time, as an actual access timing deviation value.

Optionally, wherein, a value range of P is 0~2048*16 Ts.

Optionally, wherein, the value of P is 24576 Ts.

Optionally, the method further comprises:

when the user equipment receives an Negative Acknowledgement (NACK) returned by the base station side, selecting one element from the timing adjustment set to retransmit the msg3.

Optionally, wherein, adjusting the uplink transmission timing respectively according to the values of the elements in the timing adjustment set to perform the uplink msg3 transmission comprises:

the timing adjustment used when the msg3 is transmitted for the $n^{th}$ time being $[(n \bmod M)\times P+\tilde{TA}]\times T_s$; or adjusting the uplink transmission timing respectively according to the values of the elements in the timing adjustment set to perform the uplink msg3 transmission comprises:

the timing adjustment used when the msg3 is transmitted for the $n^{th}$ time being $\{[(n-1) \bmod M]\times P+\tilde{TA}\}\times T_s$;

wherein, n=1, 2, . . . , N, N is a maximum number of times for transmitting msg3 specified by the LTE protocol.

Correspondingly, the embodiment of the present document further provides a method for determining TA, which is applied in a random access process with large cell radius coverage in a Long Term Evolution (LTE) system, comprising:

a base station performing a fixed single-window detection on the received time-domain data transmitted by the user equipment, to obtain an estimation of the TA, and sending the estimation of the TA to the user equipment; and the base station performing Cyclic Redundancy Check code (CRC) check in turn on the received msg3 transmitted by the user equipment, if the CRC check is correct, feeding back an ACK to the user equipment; if the CRC check is incorrect, feeding back an NACK to the user equipment.

Optionally, wherein, the base station sending the estimation of the TA to the user equipment comprises:

the base station sending the estimation of the TA to the user equipment through the random access response.

Optionally, wherein, the base station performing a fixed single-window detection on the received time-domain data transmitted by the user equipment comprises:

the base station performing a time-domain correlation peak value detection on the received time-domain data transmitted by the user equipment, to perform the detection in the position where the second preamble sequence of Format3 specified by the LTE protocol is located under the condition of no delay.

Optionally, wherein, the base station performing CRC check in turn on the received msg3 transmitted by the user equipment comprises:

after the CRC check performed by the base station on the msg3 transmitted by the same user equipment using the same timing adjustment is wrong for k times continuously, when the base station receives the msg3 transmitted by the user equipment using the timing adjustment again, the base station performing CRC check after performing retransmission mergence on the msg3 received during the k+1 times; wherein, k is a positive integer.

Correspondingly, the embodiment of the present document further provides a user equipment, which is applied in a random access process with large cell radius coverage in a Long Term Evolution (LTE) system, comprising:

a transmitting module, configured to transmit a random access sub-frame using Format3 specified by an LTE protocol; and further configured to adjust the uplink transmission timing respectively according to the values of the elements in the timing adjustment set calculated by a calculating module to perform the uplink msg3 transmission;

the calculating module, configured to calculate and obtain a timing adjustment set $\{[(m-1)\times P+\tilde{TA}]\times T_s\}$ for msg3 transmission according to an estimation $\tilde{TA}$ of a received TA which is transmitted by a base station and a cell radius coverage distance K, wherein, m=1, 2, . . . , M, the value of M is a minimum natural number which is greater than or equal to the quotient of K and R; R=P*c/2, which is a reference value used to calculate a number of the elements of the above set which is defined by P, wherein, c is a speed of light, the units of K and R are Km; P=TA*16 Ts, Ts=1/(15000×2048) second; the msg3 is transmission information in the random access process specified by the LTE protocol;

a receiving module, configured to receive an ACK or NACK returned by the base station side;

a timing deviation value determining module, configured to notify the transmitting module to stop the msg3 transmission when the receiving module receives the ACK, and use the timing adjustment, which is used when the msg3 is transmitted last time by the transmitting module, as an actual access timing deviation value.

Optionally, wherein, the transmitting module is configured to select one element from the timing adjustment set to retransmit the msg3 when the receiving module receives an NACK returned by the base station side.

Optionally, wherein, the transmitting module being configured to adjust the uplink transmission timing respectively according to the values of the elements in the timing adjustment set to perform the uplink msg3 transmission comprises:

the transmitting module being configured as that the timing adjustment used when the msg3 is transmitted for the $n^{th}$ time is $[(n \bmod M)\times P+\tilde{TA}]\times T_s$; or the transmitting module being configured to adjust the uplink transmission timing respectively according to the values of the elements in the timing adjustment set to perform the uplink msg3 transmission comprises:

the transmitting module being configured as that the timing adjustment used when the msg3 is transmitted for the $n^{th}$ time as $\{[(n-1) \bmod M] \times P + \widetilde{TA}\} \times T_s$;

wherein, n=1, 2, ..., N, N is a maximum number of times for transmitting msg3 specified by the LTE protocol.

Correspondingly, the embodiment of the present document further provides a base station, which is applied in a random access process with large cell radius coverage in a Long Term Evolution (LTE) system, comprising:

a receiving module, configured to receive time-domain data and msg3 transmitted by a user equipment;

a detecting module, configured to perform a fixed single-window detection on the time-domain data received by the receiving module, to obtain an estimation of the TA, and send the estimation of the TA to the user equipment;

a responding module, configured to perform Cyclic Redundancy Check code (CRC) check in turn on the msg3 received by the receiving module; if the CRC check is correct, feed back an ACK to the user equipment; if the CRC check is incorrect, feed back an NACK to the user equipment.

Optionally, wherein, the detecting module being configured to send the estimation of the TA to the user equipment comprises:

the detecting module being configured to send the estimation of the TA to the user equipment through the random access response.

Optionally, wherein, the detecting module being configured to perform a fixed single-window detection on the time-domain data received by the receiving module comprises:

the detecting module being configured to perform a time-domain correlation peak value detection on the time-domain data received by the receiving module, to perform detection in the position where the second preamble sequence of Format3 specified by the LTE protocol is located under the condition of no delay.

Optionally, wherein, the responding module being configured to perform CRC check in turn on the msg3 received by the receiving module comprises:

the responding module being configured to after the CRC check performed on the msg3 transmitted by the same user equipment using the same timing adjustment is wrong for k times continuously, when the receiving module receives the msg3 transmitted by the user equipment using the timing adjustment again, perform CRC check after performing retransmission mergence on the msg3 received during the k+1 times; wherein, k is a positive integer.

The embodiment of the present document can support a larger cell radius without changing the protocol, the required device complexity is low, and with the UE side transmitting msg3 by using different TA adjustments to obtain a correct timing deviation value, the access delay of the PRACH is minimized, and the overhead of the PRACH sub-frame will not be increased in the present document, which prevents the performance of the system from deterioration, and it can be applied to TDD and Frequency Division Duplexing (FDD) LTE systems simultaneously.

PREFERRED EMBODIMENTS OF THE PRESENT DOCUMENT

In order to make the purpose, technical solutions and advantages of the present document more clear and apparent, the embodiments of the present document will be illustrated in detail hereinafter with respect to accompanying drawings. It should be illustrated that, in the case of no conflict, the embodiments in the application and the features in the embodiments could be combined randomly with each other.

Figure 2:
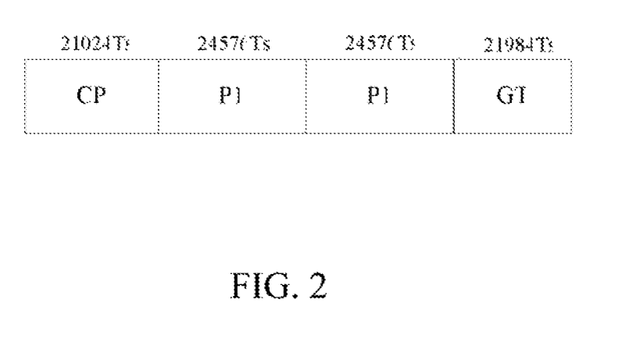
FIG. 2 is a diagram of a structure of a random sub-frame under Format3 in the existing LTE protocol.

In the present embodiment, a method for determining a timing advance, which is applied in a random access process with large cell radius coverage in an LTE system, comprises the following steps:

a) a UE transmitting a random access sub-frame using Format3 specified by an LTE protocol; wherein, the structure of the random sub-frame under Format3 is shown in FIG. 2;

b) a base station performing a fixed single-window detection on the received time-domain data, to obtain an estimation $\widetilde{TA}$ of the Timing Advance (TA for short); wherein, the detection method includes but is not limited to the time-domain correlation peak value detection method;

c) the base station side sending the $\widetilde{TA}$ obtained through step b) to the UE in the Random Access Response;

d) the UE calculating and obtaining a timing adjustment set $\{[(m-1) \times P + \widetilde{TA}] \times T_s\}$ for msg3 transmission according to an estimation $\widetilde{TA}$ of the received TA and a cell radius coverage distance K;

wherein, m=1, 2, ..., M, M is a natural number, a value of which is related to the cell radius coverage distance. Assuming that the cell radius coverage distance is K (the unit is Km), M=ceil (K/R); wherein, R is based on R=P*c/2=120, i.e., M=ceil (K/120), ceil ( ) represents a minimum integer greater than or equal to the expression in the bracket; $T_s=1/(15000 \times 2048)$ second, c is a speed of light;

e) the UE performing the uplink msg3 transmission respectively according to the values in the timing adjustment set obtained by step d), wherein the relationship between the number of times for transmitting and the elements in the timing adjustment set is configurable. Wherein, msg3 is necessary transmission information in the random access process specified in the LTE protocol, which can specifically refer to 3GPP TS36.321, and will not be described here again;

Wherein, the preferable scheme is an interval transmission scheme, i.e., the timing adjustment of the $n^{th}$ msg3 transmission is $[(n \bmod M) \times P + \widetilde{TA}] \times T_s$ or the timing adjustment of the $n^{th}$ msg3 transmission is $\{[(n-1) \bmod M] \times P + \widetilde{TA}\} \times T_s$; wherein, n=1, 2, ..., N, N is the maximum number of times for transmitting msg3 specified in the protocol;

f) for the transmission method of step e), the base station side performing Cyclic Redundancy Check code (CRC)

check in turn on the data transmitted for the n$^{th}$ time by the above UE in the detection process of the msg3; if the CRC check is correct, feeding back ACK information to the UE; if the CRC check is incorrect, feeding back NACK information to the UE;

g) when receiving the NACK, the UE continuing to retransmit msg3 in accordance with the order in step e); when receiving the ACK, stopping the transmission of msg3 and using the timing adjustment, which is used when the msg3 is transmitted last time, as an actual access timing deviation value, wherein the access timing deviation value can be used to perform the uplink access subsequently.

The above method can support a larger cell radius (larger than 120 Km) under the current protocol, and provides accurate and reliable uplink timing adjustment information to the UE, and the method is suitable for random access scenarios such as an initial access of the UE or the cell handover etc, and can effectively enhance the reliability of the UE accessing the LTE system under a large cell radius.

The above method will be further described according to a specific embodiment with a cell radius coverage distance being 220 Km.

Figure 3:
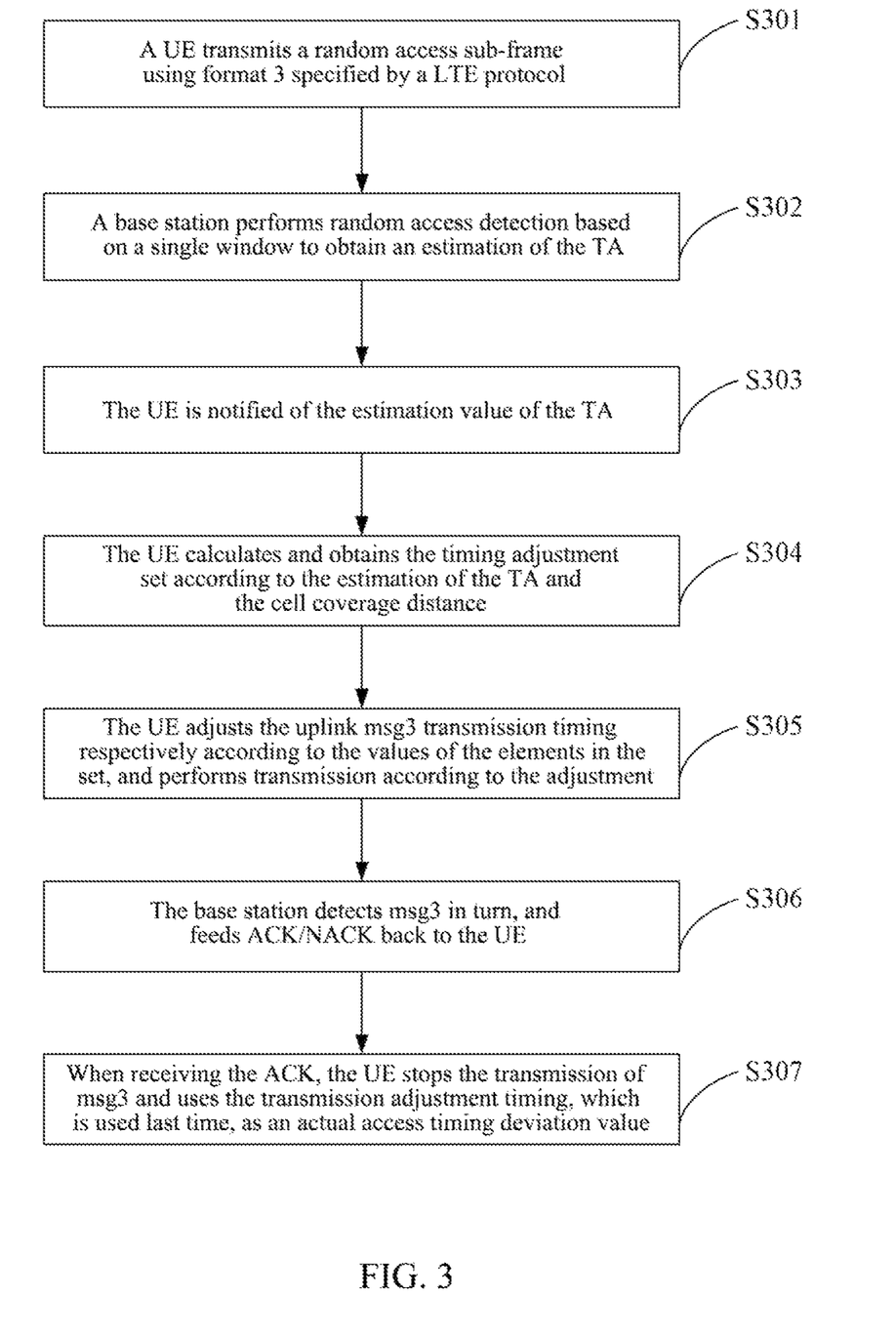
FIG. 3 is a flowchart of specific implementation of a method for determining a timing advance in an embodiment of the present document.

As shown in FIG. 3, the method for determining a timing advance comprises the following steps.

In step 301, a UE side transmits a random access sub-frame using Format3 specified by a protocol.

Figure 4:
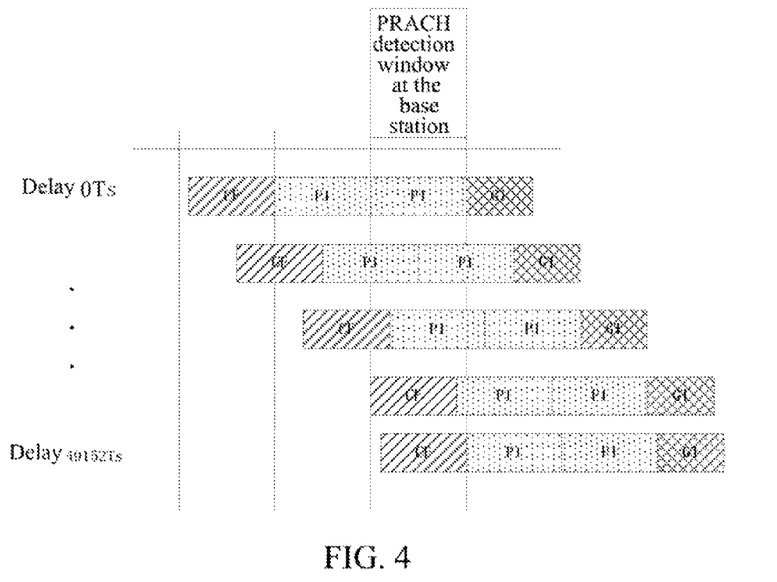
FIG. 4 is a diagram of a location of a detection single-window for a random access sub-frame at a base station side in an embodiment of the present document.

In step 302, a base station side performs a fixed single-window detection on the received time-domain data, to obtain an estimation $\tilde{TA}$ of the TA; the specific location of the window is shown in FIG. 4, i.e., the base station side performs detection in the position where a second preamble sequence of a normal Format3 is located under the condition of no delay, the location of the window can ensure that no matter what the value of the delay is, there is a CP or preamble sequence data in the window, which enhances the accuracy of the single-window detection.

The detection method includes but is not limited to the time-domain correlation peak value detection method, which is specifically as follows using a time-domain correlation detection method under a single user as an example:

assuming that the time-domain form of the received signal is y (m), and the frequency-domain form of the received signal is Y (k); the time-domain form of the local sequence is x(m), and the frequency-domain form of the local sequence is X(k), the correlation function R (m) can be expressed as:

$$R(m) = \sum_{n=0}^{N_{zc}-1} x^*(n) \cdot y(m+n) = \frac{1}{N_{zc}} \sum_{k=0}^{N_{zc}-1} X^*(k) \cdot Y(k) \cdot e^{j\frac{2\pi km}{N_{zc}}}$$

wherein, m is a cyclic shift point, * represents complex conjugate, n and k are natural numbers respectively; Nzc represents a length of the Zadoff-Chu sequence.

It is to search for a corresponding location of a detected effective peak value in the obtained correlation sequence R (m) (the method for detecting the peak value effectiveness includes but is not limited to a method of noise power plus predefined threshold determination, which is within the scope of the prior technology, and will not be described here again), and the location of the effective peak value is used as the estimation $\tilde{TA}$ of the TA. The optimum time synchronization location is:

$$\tilde{TA} = \underset{m}{\mathrm{argmax}}(R(m)).$$

By analogizing based on the above method, for the condition that multiple users access, there will be multiple effective peak values and corresponding $\tilde{TA}$ values thereof, which will not be described in this example again.

In step 303, the base station sends the $\tilde{TA}$ obtained in step 302 to the UE in the random access response;

the present step is performed based on the LTE protocol, which can specifically refer to 3GPP LTE protocol.

In step 304, the UE calculates and obtains a timing adjustment set for msg3 transmission according to the received $\tilde{TA}$ value and a cell radius coverage distance K.

In the present embodiment, preferably, P=24576 Ts, R=120 Km, the cell radius coverage distance is K=220 Km, then M=ceil (K/120)=2; the obtained timing adjustment set is $\{\tilde{TA} \times T_s, (24576+\tilde{TA}) \times T_s\}$, which includes two elements.

In step 305, the UE adjusts the uplink transmission timing respectively according to values of the elements in the timing adjustment set obtained in step 304, to perform the uplink msg3 transmission. Assuming that the maximum number of times for retransmitting msg3 is N, the transmissions can be performed respectively according to the values in the timing adjustment set during N transmissions. The specific transmission method can be set flexibly, for example, the transmission timing is adjusted according to the $\tilde{TA} \times T_s$ value for the first N/2 times to perform transmission, and the transmission timing is adjusted according to the $(\tilde{TA}+24576) \times T_s$ for the later N/2 times to perform transmission, and so on.

In order to reduce the transmission delay when transmitting msg3 as much as possible, the preferred scheme is that the transmission timing is adjusted alternately according to the maximum number of times for transmitting msg3 and the number of elements in the timing adjustment set to perform transmission, and the specific description is as follows:

assuming that the maximum number of times for transmitting is 8, the TA adjustment for the n$^{th}$ transmission is [(n mod M)×24576+$\tilde{TA}$ ]×T$_s$, n=1, 2, ..., 8; i.e., the transmission timing is adjusted according to (24576+$\tilde{TA}$ )×T$_s$ for the 1$^{st}$, 3$^{rd}$, 5$^{th}$, and 7$^{th}$ times to transmit msg3, and the transmission timing is adjusted according to $\tilde{TA} \times T_s$ for the 2$^{nd}$, 4$^{th}$, 6$^{th}$, and 8$^{th}$ times to transmit msg3.

Of course, the TA adjustment for the n$^{th}$ transmission can also be set as $\{[(n-1) \bmod M] \times 24576+\tilde{TA}\} \times T_s$, n=1, 2, ..., 8; i.e., the transmission timing is adjusted according to $\tilde{TA} \times T_s$ for the 1$^{st}$, 3$^{rd}$, 5$^{th}$, and 7$^{th}$ times to transmit msg3, and the transmission timing is adjusted according to $(24576+\tilde{TA}) \times T_s$ for the 2$^{nd}$, 4$^{th}$, 6$^{th}$, and 8$^{th}$ times to transmit msg3.

In step 306, for the transmission method of step 305, the base station side performs CRC check in turn on the transmitted data for the n$^{th}$ time in the process of detecting msg3, wherein, if the CRC check is correct, an ACK is fed back to the UE; if the CRC check is incorrect, an NACK is fed back to the UE.

The base station side can also perform retransmission mergence according to the corresponding transmission method, i.e., after the CRC check performed on the msg3 transmitted by the same user equipment using the same timing adjustment is wrong for k times continuously, when the base station receives the msg3 transmitted by the UE using the timing adjustment again, the base station performs CRC check after performing retransmission mergence on the msg3 received during the k+1 times; wherein, the retransmission mergence method can refer to the existing LTE protocol standard. Preferably, the retransmission mergence method based on signal to noise ratio is used.

In step 307, when receiving the NACK, the UE continues to adjust the transmission timing according to the order in step 305 to retransmit the msg3; when receiving the ACK, the UE stops the msg3 transmission and uses the transmission adjustment timing, which is used last time, as an actual access timing deviation value.

In step 305, assuming that the UE uses $(\tilde{TA}+24576) \times T_s$ to adjust the transmission timing to transmit msg3, if the base station detects that the msg3 fails by the CRC in the $1^{st}$ transmission, the NACK information is fed back; after receiving the NACK information, the UE uses the $\tilde{TA} \times T_s$ to adjust the transmission timing to perform $2^{nd}$ transmission, if the base station detects that the msg3 succeeds by CRC in the $2^{nd}$ transmission at this time, the ACK information is fed back. After receiving the ACK information, the UE confirms that $\tilde{TA} \times T_s$ is an actual access timing deviation value. The subsequent uplink transmissions are based on $\tilde{TA} \times T_s$ to perform uplink timing adjustment, to complete the access process.

Figure 5:
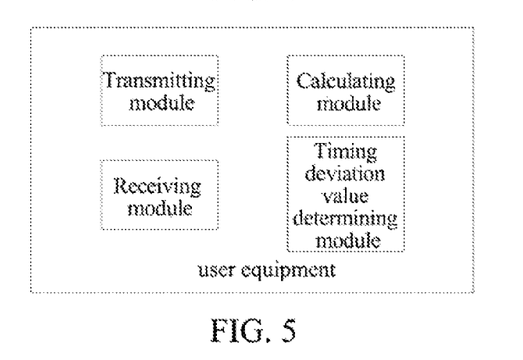
FIG. 5 is a diagram of a user equipment in an embodiment of the present document.

In addition, as shown in FIG. 5, the present embodiment further provides a user equipment, which is applied in a random access process with large cell radius coverage in a Long Term Evolution (LTE) system, comprising:

a transmitting module, configured to transmit a random access sub-frame using Format3 specified by an LTE protocol; and further configured to adjust the uplink transmission timing respectively according to the values of the elements in the timing adjustment set calculated by a calculating module to perform the uplink msg3 transmission;

the calculating module, configured to calculate and obtain a timing adjustment set $\{[(m-1) \times P + \tilde{TA}] \times T_s\}$ for msg3 transmission according to an estimation $\tilde{TA}$ of the received TA which is transmitted by a base station and a cell radius coverage distance K, wherein, m=1, 2, ..., M, the value of M is a minimum natural number which is greater than or equal to the quotient of K and R; R=P*c/2, and is a reference value used to calculate the number of the elements of the above set which is defined by P, wherein, c is a speed of light, the units of K and R are Km; P=TA*16 Ts;

a receiving module, configured to receive an ACK or NACK returned by the base station side;

a timing deviation value determining module, configured to notify the transmitting module to stop the msg3 transmission when the receiving module receives the ACK, and use the timing adjustment, which is used when the msg3 is transmitted last time by the transmitting module, as an actual access timing deviation value.

Optionally, wherein,
the transmitting module is further configured to select one element from the timing adjustment set to retransmit the msg3 when the receiving module receives an NACK returned by the base station side.

Optionally, wherein,
That the transmitting module is configured to adjust the uplink transmission timing respectively according to the values of the elements in the timing adjustment set to perform the uplink msg3 transmission, specifically comprises:

the transmitting module being configured to use the timing adjustment used when the msg3 is transmitted for the $n^{th}$ time as $[(n \bmod M) \times P + \tilde{TA}] \times T_s$; or that the transmitting module is configured to adjust the uplink transmission timing respectively according to the values of the elements in the timing adjustment set to perform the uplink msg3 transmission, specifically comprises:

the transmitting module being configured to use the timing adjustment used when the msg3 is transmitted for the $n^{th}$ time as $\{[(n-1) \bmod M] \times P + \tilde{TA}\} \times T_s$;

wherein, n=1, 2, ..., N, N is the maximum number of times for transmitting msg3 specified by the LTE protocol.

Figure 6:
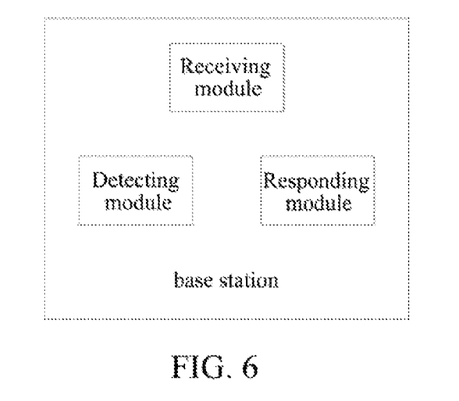
FIG. 6 is a diagram of a base station in an embodiment of the present document.

Correspondingly, as shown in FIG. 6, the present embodiment further provides a base station, which is applied in a random access process with large cell radius coverage in a Long Term Evolution (LTE) system, comprising:

a receiving module, configured to receive time-domain data and msg3 transmitted by a user equipment;

a detecting module, configured to perform a fixed single-window detection on the time-domain data received by the receiving module, to obtain an estimation of the TA, and send the estimation of the TA to the user equipment;

a responding module, configured to perform Cyclic Redundancy Check code (CRC) check in turn on the msg3 received by the receiving module; if the CRC check is correct, feed back an ACK to the user equipment; otherwise, feed back an NACK to the user equipment.

Optionally, wherein,
That the detecting module is configured to send the estimation of the TA to the user equipment, specifically comprises:

the detecting module being configured to send the estimation of the TA to the user equipment through the random access response.

Optionally, wherein,
That the detecting module is configured to perform a fixed single-window detection on the time-domain data received by the receiving module, specifically comprises:

the detecting module being configured to perform a time-domain correlation peak value detection on the time-domain data received by the receiving module, to perform detection in the position where the second preamble sequence of normal Format3 is located under the condition of no delay.

Optionally, wherein,
That the responding module is configured to perform CRC check in turn on the msg3 received by the receiving module, specifically comprises:

the responding module being configured to, after the CRC check performed on the msg3 transmitted by the same user equipment using the same timing adjustment is wrong for k times continuously, when the receiving module receives the msg3 transmitted by the user equipment using the timing adjustment again, perform CRC check after performing retransmission mergence on the msg3 received during the k+1 times; wherein, k is a positive integer.

A person having ordinary skill in the art can understand that all or partial steps in the above described method can be implemented by programs instructing related hardware. The programs can be stored in a computer readable storage media, such as a read-only memory, disk, or disc etc. Alternatively, all or partial steps in the above described embodiments can also be implemented by one or more integrated circuits. Correspondingly, each module/unit in the above embodiments can be implemented in the form of hardware, and can also be implemented in the form of software functional module. The present document is not limited to any particular form of a combination of hardware and software.

The above description is only the preferred embodiments of the present document and is not intended to limit the protection scope of the present document. According to the summary of the invention, there can be many other embodiments, and without departing from the spirit and substance of the present document, those skilled in the art can make various corresponding changes and variations according to the present document, and any modification, equivalent substitution, improvement etc. which are made within the spirit and principle of the present document should be embodied in the protection scope of the present document.

INDUSTRIAL APPLICABILITY

The embodiment of the present document provides a method, user equipment and base station for determining a timing advance, which can support a larger cell radius without changing the protocol, the required device complexity is low; and with the UE side transmitting msg3 by using different TA adjustments to obtain a correct timing deviation value, the access delay of the PRACH is minimized, and the overhead of the PRACH sub-frame will not be increased, which can prevent the performance of the system from deterioration, and it can be applied to TDD and FDD LTE systems simultaneously.

What is claimed is:

1. A method for determining a Timing Advance (TA), which is applied in a random access process with large cell radius coverage in a Long Term Evolution (LTE) system, comprising:
    a user equipment transmitting a random access sub-frame using Format3 specified by an LTE protocol;
    the user equipment calculating and obtaining a timing adjustment set $\{[(m-1)\times P+\tilde{TA}]\times T_s\}$ for msg3 transmission according to a received estimation $\tilde{TA}$ of a TA which is transmitted by a base station and a cell radius coverage distance K, and adjusting uplink transmission timing respectively according to values of elements in the timing adjustment set to perform uplink msg3 transmission; wherein, m=1, 2, . . . , M, a value of M is a minimum natural number which is greater than or equal to a quotient of K and R; R is a reference value used to calculate a number of the elements of the timing adjustment set which is defined by P, R=P*c/2, c is a speed of light, units of K and R are Km; P=TA*16 Ts, Ts=1/(15000×2048) second; the msg3 is transmission information in the random access process specified by the LTE protocol;
    when the user equipment receives an Acknowledgement (ACK) returned by the base station side, stopping the msg3 transmission, and using a timing adjustment, which is used in a last time of the msg3 transmission, as an actual access timing deviation value.

2. The method according to claim 1, wherein,
a value range of P is 0~2048*16 Ts.

3. The method according to claim 2, wherein,
a value of P is 24576 Ts.

4. The method according to claim 1, further comprising:
    when the user equipment receives an Negative Acknowledgement (NACK) returned by the base station side, selecting one element from the timing adjustment set to retransmit the msg3.

5. The method according to claim 1, wherein, adjusting uplink transmission timing respectively according to values of elements in the timing adjustment set to perform uplink msg3 transmission comprises:
    the timing adjustment which is used when the msg3 is transmitted for a $n^{th}$ time being $[(n \bmod M)\times P+\tilde{TA}]\times T_s$;
    or
    adjusting uplink transmission timing respectively according to values of elements in the timing adjustment set to perform uplink msg3 transmission comprises:
    the timing adjustment which is used when the msg3 is transmitted for a $n^{th}$ time being $\{[(n-1) \bmod M]\times P+\tilde{TA}\}\times T_s$;
    wherein, n=1, 2, . . . , N, N is a maximum number of times for transmitting msg3 specified by the LTE protocol.

6. A method for determining a Timing Advance (TA), which is applied in a random access process with large cell radius coverage in a Long Term Evolution (LTE) system, comprising:
    a base station performing a fixed single-window detection on received time-domain data transmitted by the user equipment, to obtain an estimation of the TA, and sending the estimation of the TA to the user equipment; and
    the base station performing Cyclic Redundancy Check code (CRC) check in turn on received msg3 transmitted by the user equipment, if the CRC check is correct, feeding back an ACK to the user equipment; if the CRC check is incorrect, feeding back an NACK to the user equipment; wherein, the msg3 is transmission information in the random access process specified by the LTE protocol;
    wherein the base station performing a fixed single-window detection on the received time-domain data transmitted by the user equipment comprises:
    the base station performing a time-domain correlation peak value detection on the received time-domain data transmitted by the user equipment, to perform detection in a position where a second preamble sequence of Format3 specified by the LTE protocol is located under a condition of no delay.

7. The method according to claim 6, wherein,
the base station sending the estimation of the TA to the user equipment comprises:
    the base station sending the estimation of the TA to the user equipment through a random access response.

8. The method according to claim 6, wherein,
the base station performing CRC check in turn on received msg3 transmitted by the user equipment comprises:
    after the CRC check performed by the base station on the msg3 transmitted by a same user equipment using a same timing adjustment is wrong for k times continuously, when the base station receives the msg3 transmitted by the user equipment using the timing adjustment again, the base station performing CRC check after performing retransmission mergence on the msg3 received during the k+1 times; wherein, k is a positive integer.

9. A user equipment, which is applied in a random access process with large cell radius coverage in a Long Term Evolution (LTE) system, comprising:
- a processor; and
- a storage device for storing processor executable instructions that when executed by the processor cause the processor to perform steps in following modules:
- a transmitting module, configured to transmit a random access sub-frame using Format3 specified by an LTE protocol; and further configured to adjust uplink transmission timing respectively according to values of elements in a timing adjustment set calculated by a calculating module to perform uplink msg3 transmission, the msg3 is transmission information in the random access process specified by the LTE protocol;
- the calculating module, configured to calculate and obtain a timing adjustment set $\{[(m-1) \times P + \tilde{TA}] \times T_s\}$ for msg3 transmission according to a received estimation $\tilde{TA}$ of a Timing Advance (TA) which is transmitted by a base station and a cell radius coverage distance K, wherein, m=1, 2, ..., M, a value of M is a minimum natural number which is greater than or equal to a quotient of K and R; R is a reference value used to calculate a number of the elements of the timing adjustment set which is defined by P, R=P*c/2, c is a speed of light, units of K and R are Km; P=TA*16 Ts, Ts=1/(15000×2048) second;
- a receiving module, configured to receive an Acknowledgement (ACK) or Negative Acknowledgement (NACK) returned by the base station side;
- a timing deviation value determining module, configured to notify the transmitting module to stop the msg3 transmission when the receiving module receives the ACK, and use a timing adjustment, which is used in a last time of the msg3 transmission by the transmitting module, as an actual access timing deviation value.

10. The user equipment according to claim 9, wherein, the transmitting module is further configured to select one element from the timing adjustment set to retransmit the msg3 when the receiving module receives an NACK returned by the base station side.

11. The user equipment according to claim 9, wherein, the transmitting module being configured to adjust uplink transmission timing respectively according to values of elements in a timing adjustment set to perform uplink msg3 transmission comprises:
- the transmitting module being configured as that the timing adjustment which is used when the msg3 is transmitted for a $n^{th}$ time is $[(n \mod M) \times P + \tilde{TA}] \times T_s$; or
- the transmitting module being configured to adjust uplink transmission timing respectively according to values of elements in a timing adjustment set to perform uplink msg3 transmission comprises:
- the transmitting module being configured as that the timing adjustment which is used when the msg3 is transmitted for a $n^{th}$ time is $\{[(n-1) \mod M] \times P + \tilde{TA}\} \times T_s$;
- wherein, n=1, 2, ..., N, N is a maximum number of times for transmitting msg3 specified by the LTE protocol.

12. A base station, which is applied in a random access process with large cell radius coverage in a Long Term Evolution (LTE) system, comprising:
- a processor; and
- a storage device for storing processor executable instructions that when executed by the processor cause the processor to perform steps in following modules:
- a receiving module, configured to receive time-domain data and msg3 transmitted by a user equipment, wherein, the msg3 is transmission information in the random access process specified by the LTE protocol;
- a detecting module, configured to perform a fixed single-window detection on the time-domain data received by the receiving module, to obtain an estimation of a Timing Advance (TA), and send the estimation of the TA to the user equipment;
- a responding module, configured to perform Cyclic Redundancy Check code (CRC) check in turn on the msg3 received by the receiving module; if the CRC check is correct, feed back an ACK to the user equipment; if the CRC check is incorrect, feed back an NACK to the user equipment;
- wherein the detecting module being configured to perform a fixed single-window detection on the time-domain data received by the receiving module comprises:
- the detecting module being configured to perform a time-domain correlation peak value detection on the time-domain data received by the receiving module, to perform detection in a position where a second preamble sequence of format 3 specified by the LTE protocol is located under a condition of no delay.

13. The base station according to claim 12, wherein, the detecting module being configured to send the estimation of the TA to the user equipment comprises:
- the detecting module being configured to send the estimation of the TA to the user equipment through a random access response.

14. The base station according to claim 12, wherein, the responding module being configured to perform CRC check in turn on the msg3 received by the receiving module comprises:
- the responding module being configured to, after the CRC check performed on the msg3 transmitted by a same user equipment using a same timing adjustment is wrong for k times continuously, when the receiving module receives the msg3 transmitted by the user equipment using the timing adjustment again, perform CRC check after performing retransmission mergence on the msg3 received during the k+1 times; wherein, k is a positive integer.

* * * * *